United States Patent
Wu et al.

(10) Patent No.: US 9,086,866 B2
(45) Date of Patent: Jul. 21, 2015

(54) POWER SUPPLY CIRCUIT FOR HARD DISK DRIVE

(75) Inventors: Kang Wu, Shenzhen (CN); Wei-Dong Cong, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 450 days.

(21) Appl. No.: 13/568,043

(22) Filed: Aug. 6, 2012

(65) Prior Publication Data

US 2013/0321945 A1     Dec. 5, 2013

(30) Foreign Application Priority Data

May 31, 2012 (CN) .......................... 2012 1 0176194

(51) Int. Cl.
     *G06F 1/26*      (2006.01)
     *G11B 19/20*     (2006.01)
     *H02J 1/10*      (2006.01)

(52) U.S. Cl.
     CPC ................ *G06F 1/26* (2013.01); *G11B 19/209* (2013.01)

(58) Field of Classification Search
     USPC ...................................... 307/23, 43
     See application file for complete search history.

(56) References Cited

U.S. PATENT DOCUMENTS

2008/0191552 A1*   8/2008   Suzuki et al. ................... 307/23

* cited by examiner

*Primary Examiner* — Robert DeBeradinis
(74) *Attorney, Agent, or Firm* — Novak Druce Connolly Bove + Quigg LLP

(57) ABSTRACT

A power supply circuit for powering first and second groups of hard disk drives in a cabinet, includes a connector and first to third connection units. When there is only one server in the cabinet, the first node is connected to the first power terminal of the connector, the first connection unit is turned on, and the second connection unit is turned off. When there are two servers in the cabinet, the first and second nodes are respectively connected to the first and second power terminals of the connector, the first connection unit is turned on, and the second and third connection units are turned off.

11 Claims, 4 Drawing Sheets

POWER SUPPLY CIRCUIT FOR HARD DISK DRIVE

BACKGROUND

1. Technical Field

The present disclosure relates to a circuit for supplying power to hard disk drives in servers.

2. Description of Related Art

When there is only one server in a cabinet, hard disk drives are powered by the server. When there are two servers in the cabinet, the hard disk drives are divided into two groups. Each group of hard disk drives are powered by a single server. In this condition, backplanes for the cabinet with only one server and for the cabinet with two servers are different. This is an inconvenience.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one".

Figure 1:
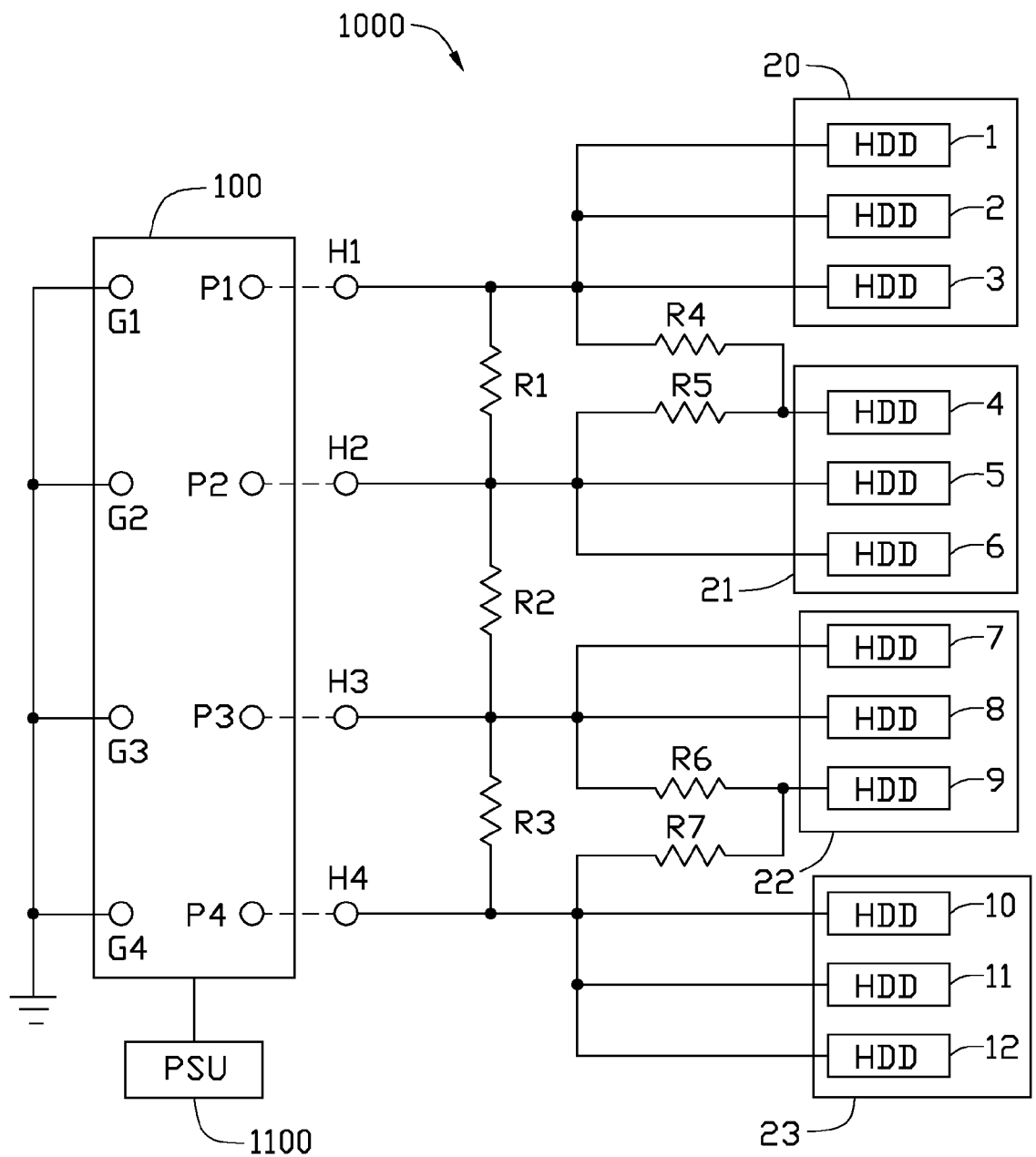
FIG. 1 is a circuit diagram of a first exemplary embodiment of a power supply circuit for hard disk drives.

Referring to FIG. 1, a power supply circuit is set on a backplane. The backplane is set in a cabinet 1000. A first exemplary embodiment of the power supply circuit includes a connector 100 and a plurality of resistors. In this embodiment, there are twelve hard disk drives (HDDs) 1-12 in the cabinet 1000. The cabinet 1000 can contain four servers 20, 21, 22, and 23. The resistors include seven resistors R1-R7.

If there is only one server in the cabinet 1000, the HDDs 1-12 are powered by the single server. If there are two servers in the cabinet 1000, the HDDs 1-12 are divided into two groups. Each group of HDDs includes six HDDs, and is powered by one of the two servers. If there are three servers in the cabinet 1000, the HDDs 1-12 are divided into three groups. Each group of HDDs includes four HDDs, and is powered by one of the three servers. If there are four servers in the cabinet 1000, the twelve HDDs 1-12 are divided into four groups. Each group of HDDs includes three HDDs, and is powered by one of the four servers.

The connector 100 includes four power terminals P1-P4, and four ground terminals G1-G4. The connector 100 receives power from a power supply unit (PSU) 1100, and outputs power from the four power terminals P1, P2, P3, and P4. The four ground terminals G1-G4 are grounded.

Power terminals of the HDDs 1-3 are connected to a node H1. Power terminals of the HDDs 5 and 6 are connected to a node H2. A power terminal of the HDD 4 is connected to the node H2 through the resistor R5. Power terminals of the HDDs 7 and 8 are connected to a node H3. A power terminal of the HDD 9 is connected to the node H3 through the resistor R6. Power terminals of the HDDs 10-12 are connected to a node H4. The power terminal of the HDD 3 is further connected to the power terminal of the HDD 4 through the resistor R4. The power terminal of the HDD 9 is further connected to the power terminal of the HDD 10 through the resistor R7.

The node H1 is further connected to the node H2 through the resistor R1. The node H2 is further connected to the node H3 through the resistor R2. The node H3 is further connected to the node H4 through the resistor R3.

The manner of operation of the power supply circuit is as follows.

When there is only one server in the cabinet 1000, the server provides power for the HDDs 1-12. In this condition, the resistors R1, R2, R3, R5, and R6 are used as part of the circuitry of the backplane, and the resistors R4 and R7 are removed from the circuitry of the backplane. The node H1 is connected to the power terminal P1 of the connector 100.

In this condition, the power terminal P1 of the connector 100 outputs power to the node H1. As a result, power from the node H1 is transmitted to the HDDs 1-3, and is transmitted to the HDDs 5 and 6 through the resistor R1, and is transmitted to the HDD 4 through the resistors R1 and R5 in series, and is transmitted to the HDDs 7 and 8 through the resistors R1 and R2 in series, and is transmitted to the HDD 9 through the resistors R1, R2, and R6 in series, and is transmitted to the HDDs 10-12 through the resistors R1, R2, and R3 in series.

When there are two servers in the cabinet 1000, each server provides power for a group of HDDs. In this condition, the resistors R1, R3, R5, and R6 are use as part of the circuitry of the backplane, and the resistors R2, R4 and R7 are removed from the circuitry of the backplane. The node H1 is connected to the power terminal P1 of the connector 100, and the node H3 is connected to the power terminal P3 of the connector 100.

In this condition, the power terminal P1 of the connector 100 outputs power to the node H1, and the power terminal P3 of the connector 100 outputs power to the node H3. As a result, power from the node H1 is transmitted to the HDDs 1-3, and is transmitted to the HDDs 5 and 6 through the resistor R1, and is transmitted to the HDD 4 through the resistors R1 and R5 in series. Power from the node H3 is transmitted to the HDDs 7 and 8, and is transmitted to the HDD 9 through the resistor R6, and is transmitted to the HDDs 10-12 through the resistor R3.

When there are three servers in the cabinet 1000, each server provides power for a group of HDDs. In this condition, the resistors R2, R4, and R7 are used as part of the circuitry of the backplane, and the resistors R1, R3, R5, and R6 are removed from the circuitry of the backplane. The node H1 is connected to the power terminal P1 of the connector 100, the node H3 is connected to the power terminal P3 of the connector 100, and the node H4 is connected to the power terminal P4 of the connector 100.

In this condition, the power terminal P1 of the connector 100 outputs power to the node H1, the power terminal P3 of the connector 100 outputs power to the node H3, and the power terminal P4 of the connector 100 outputs power to the node H4. As a result, power from the node H1 is transmitted to the HDDs 1-3, and is transmitted to the HDD 4 through the resistor R4. Power from the node H3 is transmitted to the HDDs 5 and 6 through the resistor R2, and is transmitted to the HDDs 7 and 8. Power from the node H4 is transmitted to the HDD 9 through the resistor R7, and is transmitted to the HDDs 10-12.

When there are four servers in the cabinet 1000, each server provides power for a group of HDDs. In this condition, the resistors R5 and R6 are used as part of the circuitry of the backplane, and the resistors R1-R4, and R7 are removed from the circuitry of the backplane. The node H1 is connected to the power terminal P1 of the connector 100, the node H2 is connected to the power terminal P2 of the connector 100, the node H3 is connected to the power terminal P3 of the connector 100, and the node H4 is connected to the power terminal P4 of the connector 100.

In this condition, the power terminal P1 of the connector 100 outputs power to the node H1, the power terminal P2 of the connector 100 outputs power to the node H2, the power terminal P3 of the connector 100 outputs power to the node H3, and the power terminal P4 of the connector 100 outputs power to the node H4. As a result, power from the node H1 is transmitted to the HDDs 1-3. Power from the node H2 is transmitted to the HDD 4 through the resistor R5, and is transmitted to the HDDs 5 and 6. Power from the node H3 is transmitted to the HDDs 7 and 8, and is transmitted to the HDD 9 through the resistor R6. Power from the node H4 is transmitted to the HDDs 10-12.

Figure 2:
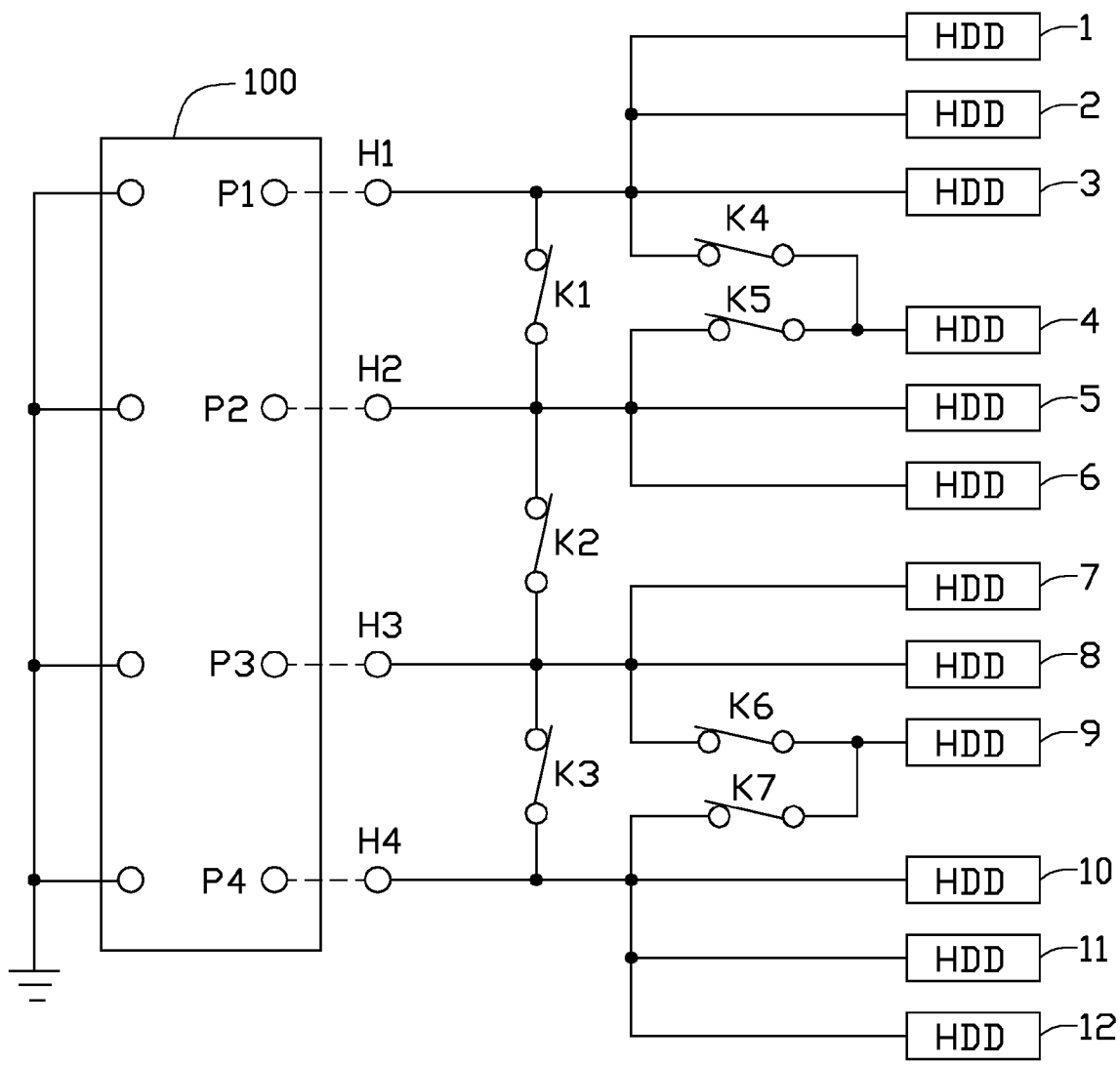
FIG. 2 is a circuit diagram of a second exemplary embodiment of a power supply circuit for hard disk drives.

Referring to FIG. 2, a second exemplary embodiment of a power supply circuit is shown. In the second exemplary embodiment, seven connection units, such as seven switches K1-K7 replace the seven resistors R1-R7 in the first exemplary embodiment. For example, when there are four servers in the cabinet, the switches K5 and K6 are turned on, and the switches K1-K4 and K7 are turned off.

Figure 3:
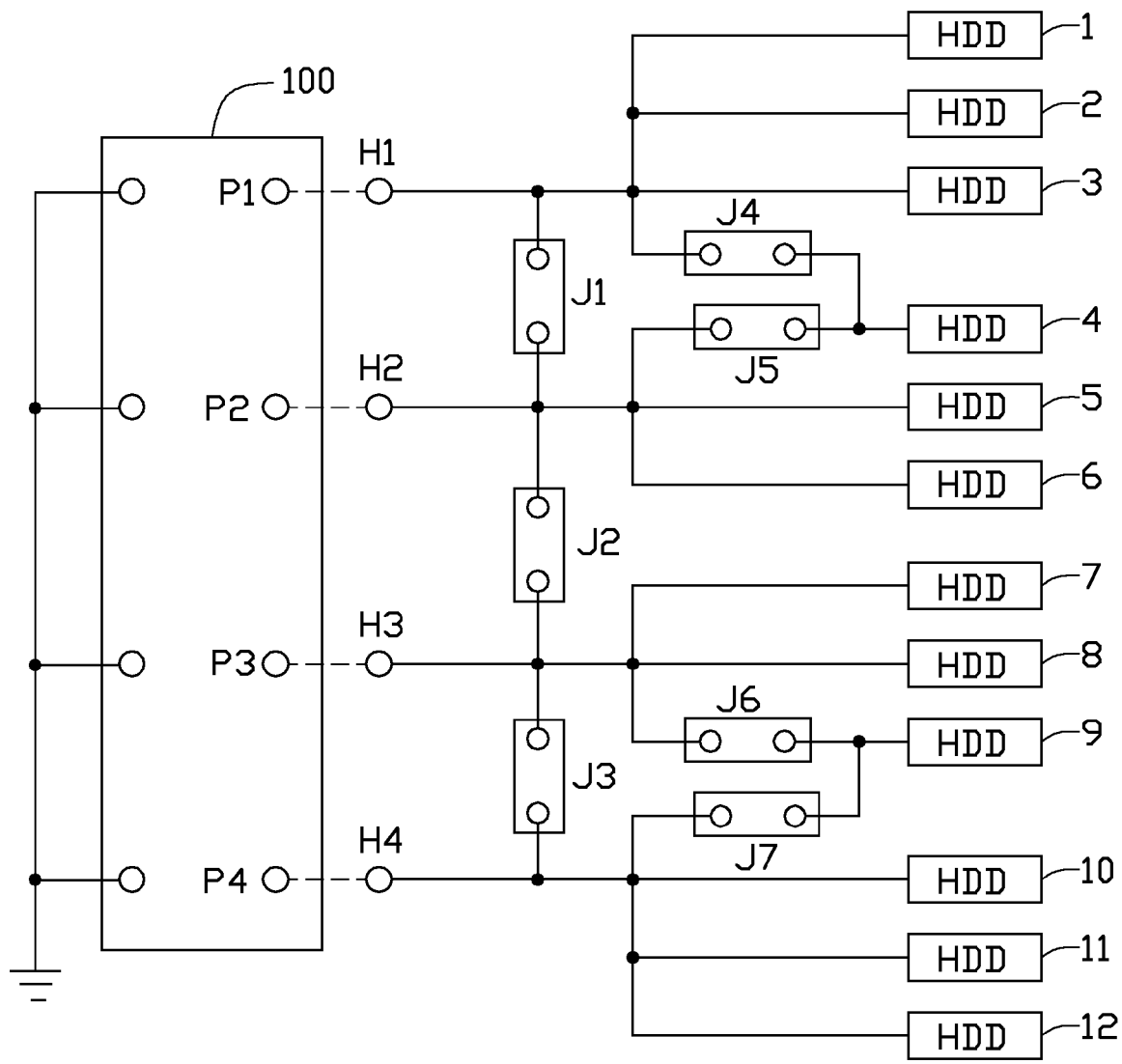
FIG. 3 is a circuit diagram of a third exemplary embodiment of a power supply circuit for hard disk drives.

Referring to FIG. 3, a third exemplary embodiment of a power supply circuit is shown. In the third exemplary embodiment, seven jumpers J1-J7 replace the seven switches K1-K7 in the second exemplary embodiment. Each jumper includes two pins and a connecting cap. For example, when there are four servers in the cabinet, the two pins of the jumper J5 are connected by the cap, the two pins of the jumper J6 are connected by the cap, the two pins of each of the jumpers J1-J4 and J7 are disconnected.

Figure 4:
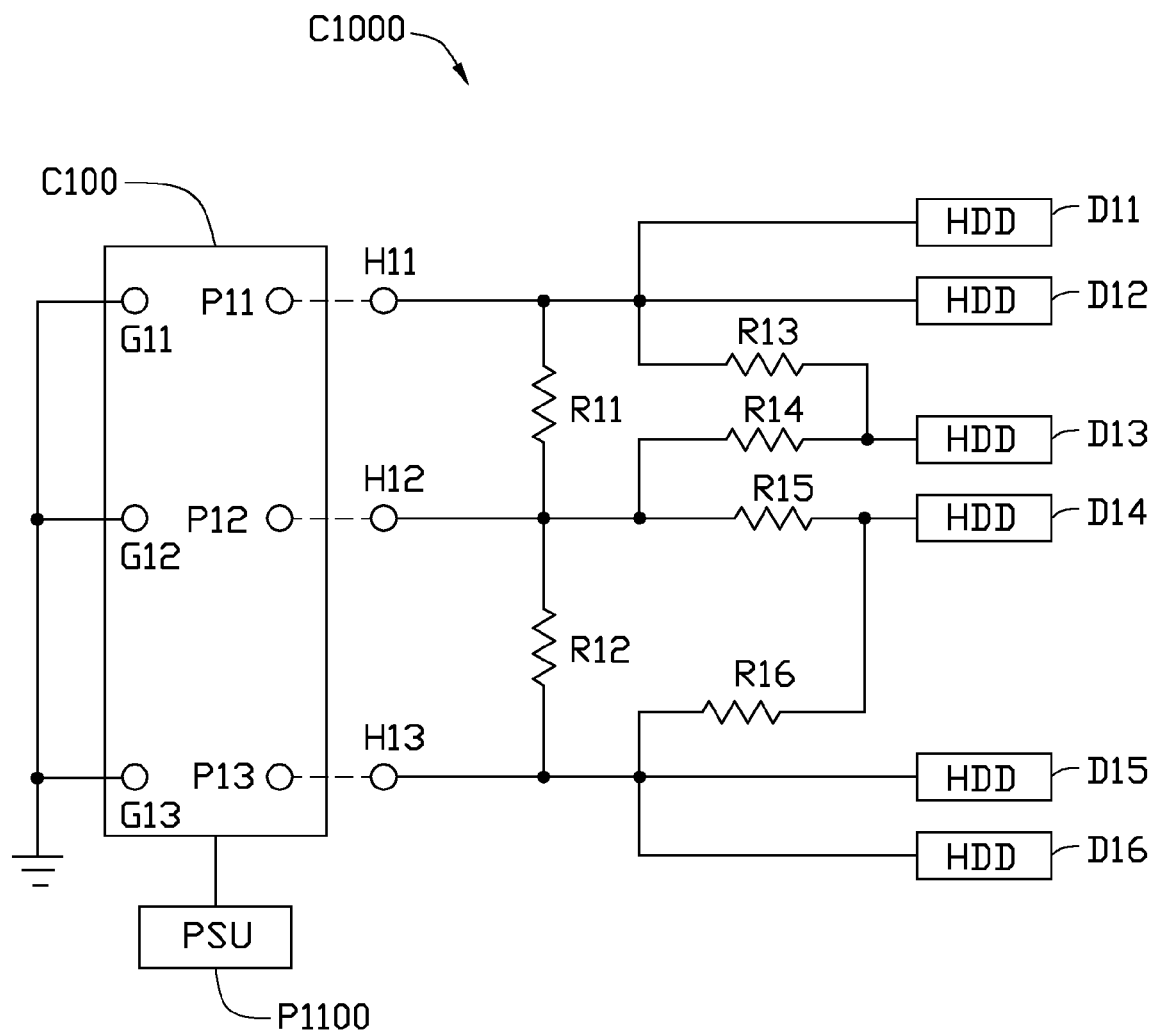
FIG. 4 is a circuit diagram of a fourth exemplary embodiment of a power supply circuit for hard disk drives.

Referring to FIG. 4, a fourth exemplary embodiment of a power supply circuit includes a connector C100 and six resistors R11-R16. In this embodiment, there are six HDDs D11 through D16 in a cabinet C1000. The cabinet C1000 can contain three servers.

The connector C100 includes three power terminals P11, P12, and P13, and three ground terminals G11, G12, and G13. The connector C100 receives power from a PSU P1100, and outputs power through the three power terminals P11, P12, and P13. The three ground terminals G11, G12, and G13 are grounded.

Power terminals of the HDDs D11 and D12 are connected to a node H11. Power terminals of the HDDs D13 and D14 are respectively connected to first terminals of the resistors R14 and R15. Second terminals of the resistors R14 and R15 are connected to a node H12. The power terminal of the HDD D12 is further connected to the power terminal of the HDD D13 through the resistor R13. Power terminals of the HDDs D15 and D16 are connected to a node H13. The power terminal of the HDD D14 is further connected to the power terminal of the HDD D15 through the resistor R16. The node H11 is further connected to the node H12 through the resistor R11. The node H12 is further connected to the node H13 through the resistor R12.

When only one server is in the cabinet C1000, the server powers the six HDDs D11-D16. In this condition, the resistors R11, R12, R14, and R15 are welded onto the backplane, and the resistors R13 and R16 are taken off from the backplane. Meanwhile, the node H11 is connected to the power terminal P11 of the connector C200.

In this condition, the power terminal P11 of the connector C100 outputs power to the node H11. As a result, power from the node H11 is transmitted to the HDDs D11 and D12, is transmitted to the HDD D13 through the resistors R11 and R14, is transmitted to the HDD D14 through the resistors R11 and R15, and is transmitted to the HDDs D15 and D16 through the resistor R12.

When there are two servers in the cabinet C1000, the two servers respectively power the HDDs D11-D13 and D14-D16. In this condition, the resistors R13 and R16 are welded onto the backplane, and the resistors R11, R12, R14, and R15 are taken off from the backplane. Meanwhile, the node H11 is connected to the power terminal P11 of the connector 100, and the node H13 is connected to the power terminal P13 of the connector 100.

In this condition, the power terminal P11 of the connector C100 outputs power to the node H1, and the power terminal P12 of the connector C100 outputs power to the node H12. As a result, power from the node H11 is transmitted to the HDDs D11 and D12, and is transmitted to the HDD D13 through the resistor R13. Power from the node H13 is transmitted to the HDDs 5 and 6, and is transmitted to the HDD D14 through the resistor R16.

When there are three servers in the cabinet C1000, the three servers respectively power the HDDs D11 and D12, D13 and D14, D15 and D16. In this condition, the resistors R14 and R15 are welded onto the backplane, and the resistors R11-R13, and R16 are taken off from the backplane. Meanwhile, the node H11 is connected to the power terminal P11 of the connector 100, the node H12 is connected to the power terminal P12 of the connector C100, and the node H13 is connected to the power terminal P13 of the connector C100.

In this condition, the power terminal P11 of the connector C100 outputs power to the node H1, the power terminal P12 of the connector C100 outputs power to the node H12, and the power terminal P13 of the connector C100 outputs power to the node H13. As a result, power from the node H11 is transmitted to the HDDs D11 and D12. Power from the node H12 is transmitted to the HDDs 3 and 4 through the resistors R14 and R15. Power from the node H13 is transmitted to the HDDs 5 and 6.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments were chosen and described in order to explain the principles of the disclosure and their practical application so as to enable others of ordinary skill in the art to utilize the disclosure and various embodiments and with such various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A power supply circuit for powering first and second groups of hard disk drives (HDDs) in a cabinet, each group of HDDs comprises a plurality of HDDs, the power supply circuit comprising:

a connector comprising first and second power terminals, and a ground terminal grounded, wherein the connector receives power from a power supply unit and outputs the power from the first and second power terminals; and first to third resistors, wherein power terminals of each HDD in the first group of HDDs are connected to a first node, a power terminal of a first HDD in the second group of HDDs is connected to a first terminal of the first resistor, a second terminal of the first resistor and power terminals of other HDDs in the second group of HDDs are connected to a second node, the power terminal of the last HDD is further connected to a power terminal of a first HDD in the second group of HDDs through the second resistor, the first node is further connected to the second node through the third resistor;

wherein when there is one server in the cabinet, the first node is connected to the first power terminal of the connector, the second resistor is removed from the power supply circuit; wherein when there are two servers in the cabinet, the first and second nodes are respectively connected to the first and second power terminals of the connector, the second and third resistors are removed from the power supply circuit.

2. The power supply circuit of claim 1, further comprising third and fourth groups of HDDs, wherein each of the third and fourth groups of HDDs comprises at least two HDDs, wherein the power supply circuit further comprises fourth to seventh resistors, the connector further comprises third and fourth power terminals, power terminals of first to penultimate HDDs in the third group of HDDs are connected to a third node, a power terminal of the last HDD in the third group of HDDs is connected to the third node through the fourth resistor, a power terminal of a first HDD in the fourth group of HDDs is connected to a first terminal of the fifth resistor, a second resistor is connected to the power terminal of the last HDD in the third group of HDDs, a power terminal of each HDD in the fourth group of HDDs is connected to a fourth node, the second node is further connected to the third node through the sixth resistor, the third node is further connected to the third node through the seventh resistor; wherein when there is one server in the cabinet, the first node is connected to the first power terminal of the connector, the second and fifth resistors are taken off; wherein when there are two servers in the cabinet, the first node is connected to the first power terminal of the connector, the third node is connected to the third power terminal of the connector, the second, fifth, and sixth resistors are removed from the power supply circuit; wherein when there are three servers in the cabinet, the first, third, and fourth nodes are respectively connected to the first, third, and fourth power terminals of the connector, the first, third, fourth, and seventh resistors are removed from the power supply circuit; wherein when there are four servers in the cabinet, the first to fourth nodes are respectively connected to the first to fourth power terminals of the connector, the second, third, fifth, sixth, and seventh resistors are removed from the power supply circuit.

3. A power supply circuit for powering first and second groups of hard disk drives (HDDs) in a cabinet, each group of HDDs comprises a plurality of HDDs, the power supply circuit comprising:

a connector comprising first and second power terminals, and a ground terminal grounded, wherein the connector receives power from a power supply unit and outputs the power from the first and second power terminals; and first to third connection units, wherein power terminals of each HDD in the first group of HDDs are connected to a first node, a power terminal of a first HDD in the second group of HDDs is connected to a first terminal of the first connection unit, a second terminal of the first connection unit and power terminals of other HDDs in the second group of HDDs are connected to a second node, the power terminal of the last HDD is further connected to a power terminal of a first HDD in the second group of HDDs through the second connection unit, the first node is further connected to the second node through the third connection unit;

wherein when there is one server in the cabinet, the first node is connected to the first power terminal of the connector, the first connection unit is turned on, the second connection unit is turned off; wherein when there are two servers in the cabinet, the first and second nodes are respectively connected to the first and second power terminals of the connector, the first connection unit is turned on, the second and third connection units are turned off.

4. The power supply circuit of claim 3, wherein each connection unit comprises a switch, when the switch is turned on, the corresponding connection unit is turned on; when the switch is turned off, the corresponding connection unit is turned off.

5. The power supply circuit of claim 3, wherein each connection unit comprises a jumper, when two pins of a jumper are connected through a connecting cap of the jumper, the corresponding connection unit is turned on, and when the two pins of the jumper are not connected, the corresponding connection unit is turned off.

6. The power supply circuit of claim 3, further comprising third and fourth groups of HDDs, wherein each of the third and fourth groups of HDDs comprises at least two HDDs, wherein the power supply circuit further comprises fourth to seventh connection units, the connector further comprises third and fourth power terminals, power terminals of first to penultimate HDDs in the third group of HDDs are connected to a third node, a power terminal of the last HDD in the third group of HDDs is connected to the third node through the fourth connection unit, a power terminal of a first HDD in the fourth group of HDDs is connected to a first terminal of the fifth connection unit, a second terminal of the fifth connection unit is connected to the power terminal of the last HDD in the third group of HDDs, a power terminal of each HDD in the fourth group of HDDs is connected to a fourth node, the second node is further connected to the third node through the sixth connection unit, the third node is further connected to the third node through the seventh connection unit; wherein when there is one server in the cabinet, the first node is connected to the first power terminal of the connector, the first, third, fourth, sixth, and seventh connection units are turned on, the second and fifth connection unit are turned off; wherein when there are two servers in the cabinet, the first node is connected to the first power terminal of the connector, the third node is connected to the third power terminal of the connector, the first, third, fourth, and seventh connection units are turned on, the second, fifth, and sixth connection units are turned off; wherein when there are three servers in the cabinet, the first, third, and fourth nodes are respectively connected to the first, third, and fourth power terminals of the connector, the second, fifth, and sixth connection units are turned on, the first, third, fourth, and seventh connection units are turned off; wherein when there are four servers in the cabinet, the first to fourth nodes are respectively connected to the first to fourth power terminals of the connector, the first and fourth connection units are turned on, the second, third, fifth, sixth, and seventh connection units are turned off.

7. The power supply circuit of claim 6, wherein each connection unit comprises a switch, when the switch is turned on, the corresponding connection unit is turned on; when the switch is turned off, the corresponding connection unit is turned off.

8. The power supply circuit of claim 6, wherein each connection unit comprises a jumper, when two pins of a jumper are connected through a cap of the jumper, the corresponding connection unit is turned on, and when the two pins of the jumper are not connected, the corresponding connection unit is turned off.

9. A power supply circuit for powering first to third groups of hard disk drives (HDDs) in a cabinet, each group of HDDs comprises a plurality of HDDs, the power supply circuit comprising:
   a connector comprising first to third power terminals, and a ground terminal grounded, wherein the connector receives power from a power supply unit and outputs the power from the first to third power terminals; and
   first to sixth connection units, wherein power terminals of each HDD in the first group of HDDs are connected to a first node, a power terminal of a first HDD in the second group of HDDs is connected to a first terminal of the first connection unit, a power terminal of the last HDD in the second group of HDDs is connected to a first terminal of the second connection unit, second terminals of the first and second connection units and power terminals of other HDDs in the second group of HDDs are connected to a second node, the power terminal of the last HDD of the first group of HDDs is further connected to a power terminal of a first HDD in the second group of HDDs through a third connection unit, a power terminal of a first HDD in the third group of HDDs is connected to a power terminal of the last HDD in the second group of HDDs through the fourth connection unit, a power terminal of each HDD in the third group of HDDs is connected to a third node, the first node is further connected to the second node through the fifth connection unit, the second node is further connected to the third node between the sixth connection unit;
   wherein when there is one server in the cabinet, the first node is connected to the first power terminal of the connector, the first, second, fifth, and sixth connection units are turned on, the third and fourth connection units are turned off; wherein when there are two servers in the cabinet, the first and third nodes are respectively connected to the first and third power terminals of the connector, the first, second, fifth, and sixth connection units are turned off, the third and fourth connection units are turned on; wherein when there are three HDDs in the cabinet, the first to third nodes are respectively connected to the first to third power terminals of the connector, the first and second connection units are turned on, the third to sixth connections are turned off.

10. The power supply circuit of claim 9, wherein each connection unit comprises a switch, when the switch is turned on, the corresponding connection unit is turned on; when the switch is turned off, the corresponding connection unit is turned off.

11. The power supply circuit of claim 9, wherein each connection unit comprises a jumper, when two pins of a jumper are connected through a connecting cap of the jumper, the corresponding connection unit is turned on, and when the two pins of the jumper are not connected, the corresponding connection unit is turned off.

* * * * *